United States Patent
Kurokawa et al.

(10) Patent No.: US 7,672,600 B2
(45) Date of Patent: Mar. 2, 2010

(54) IMAGE FORMING APPARATUS, SUBUNIT REPLACING METHOD, AND MAINTENANCE METHOD OF AN IMAGE FORMING APPARATUS

(75) Inventors: Keiko Kurokawa, Saitama (JP); Kuniaki Arai, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 665 days.

(21) Appl. No.: 11/483,000

(22) Filed: Jul. 10, 2006

(65) Prior Publication Data
US 2007/0166068 A1    Jul. 19, 2007

(30) Foreign Application Priority Data
Jan. 18, 2006   (JP)   ............... 2006-009950

(51) Int. Cl.
   *G03G 15/00*   (2006.01)
(52) U.S. Cl. ........................................... 399/18; 399/81
(58) Field of Classification Search ................... 399/11, 399/18, 21, 31, 24–27, 33, 34, 36, 37, 81, 399/367, 380; 345/2.1; 715/761
See application file for complete search history.

(56) References Cited

U.S. PATENT DOCUMENTS

| | | | | |
|---|---|---|---|---|
| 3,655,283 A | * | 4/1972 | Margulis et al. | 399/21 |
| 4,977,429 A | * | 12/1990 | Tani et al. | 399/27 |
| 5,200,779 A | * | 4/1993 | Nawata | 399/24 |
| 5,602,625 A | * | 2/1997 | Okamoto et al. | 399/21 |
| 6,091,915 A | * | 7/2000 | Takagishi | 399/81 |
| 6,658,218 B2 | * | 12/2003 | Krolczyk et al. | 399/16 |
| 7,092,646 B2 | * | 8/2006 | Schroath et al. | 399/21 |

FOREIGN PATENT DOCUMENTS

| | | | | |
|---|---|---|---|---|
| JP | 02039077 A | * | 2/1990 |
| JP | 02147545 A | * | 6/1990 |
| JP | 11119609 A | | 4/1999 |
| JP | 11284792 A | * | 10/1999 |
| JP | 3484369 B2 | | 10/2003 |
| JP | 2005274811 A | * | 10/2005 |

OTHER PUBLICATIONS

Chinese Office Action dated Jul 4, 2008.

* cited by examiner

*Primary Examiner*—Robert Beatty
(74) *Attorney, Agent, or Firm*—Sughrue Mion, PLLC

(57) ABSTRACT

An image forming apparatus that includes: a movable unit that can move between a first position that is for when image formation is being performed and a second position that is retreated from the first position; a first display that is used when the movable unit is in the first position; and a second display that is used when the movable unit is in the second position.

19 Claims, 7 Drawing Sheets

IMAGE FORMING APPARATUS, SUBUNIT REPLACING METHOD, AND MAINTENANCE METHOD OF AN IMAGE FORMING APPARATUS

BACKGROUND

1. Technical Field

The present invention relates to image forming apparatus such as a copier, a facsimile machine, and a printer, a subunit replacing method for replacing a subunit that is provided in those apparatus, and a maintenance method of those apparatus.

2. Related Art

In image forming apparatus of the above kind, a technique is known which issues an instruction to replace a subunit of a developing device or a process cartridge or indicates a location where a sheet transport failure has occurred, using a display such as an LCD.

SUMMARY

According to an aspect of the invention, there is provided an image forming apparatus comprising: a movable unit that can move between a first position that is for when image formation is being performed and a second position that is retreated from the first position; a first display that is used when the movable unit is in the first position; and a second display that is used when the movable unit is in the second position.

BRIEF DESCRIPTION OF THE DRAWINGS

Exemplary embodiments of the present invention will be described in detail based on the following figures, wherein:

FIG. 2A is a perspective view showing a state that a document reading device is located at a use position and FIG. 2B shows a state that the document reading device is located at a retreated position.

DETAILED DESCRIPTION

Next, exemplary embodiments of the present invention will be described with reference to the drawings.

Figure 1:
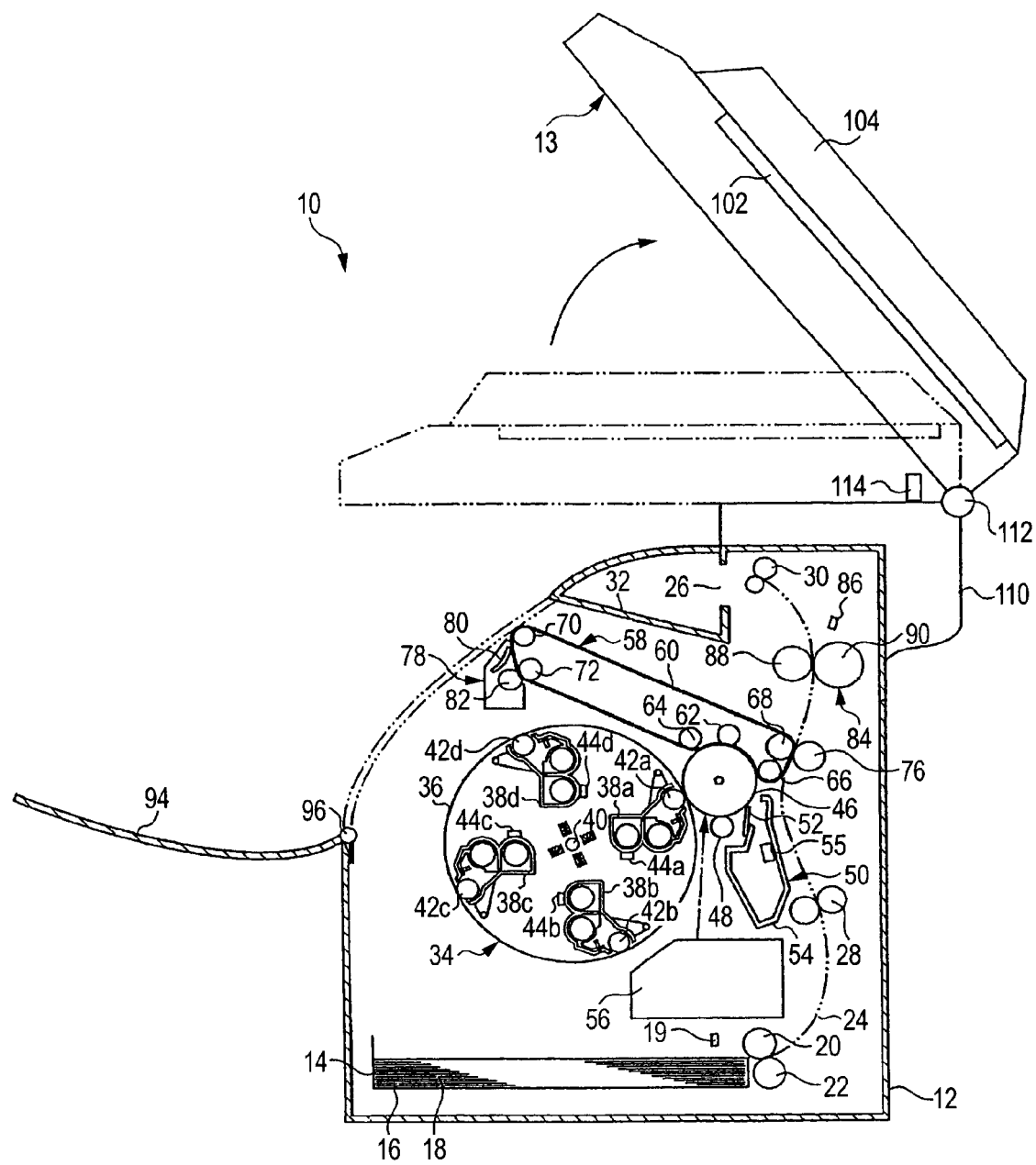
FIG. 1 is a sectional view showing the configuration of an image forming apparatus according to a first exemplary embodiment of the present invention.
Figure 2A:
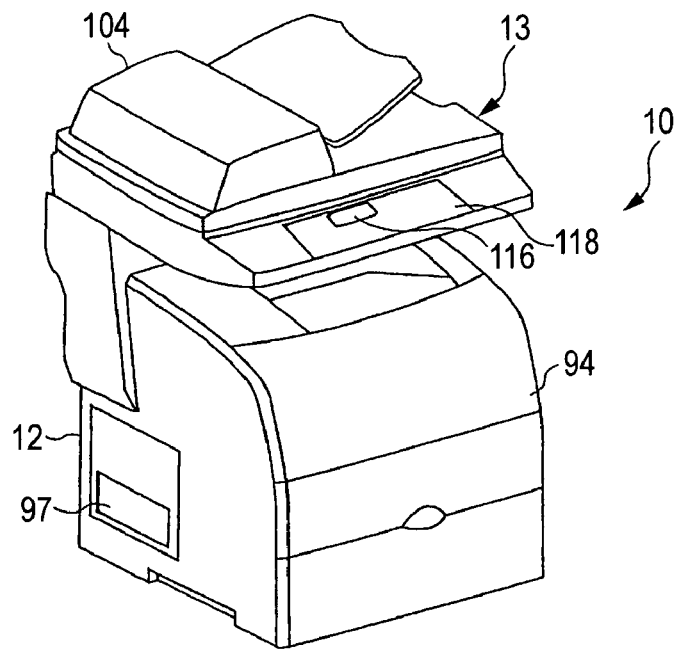
FIGS. 2A and 2B show the image forming apparatus according to a first exemplary embodiment of the invention; more specifically.

FIGS. 1 and 2 show an image forming apparatus 10 according to a first exemplary embodiment of the invention. The image forming apparatus 10 has an image forming apparatus main body 12, and a sheet supply unit 14 for supplying a sheet such as a plain sheet or an OHP sheet as a recording medium occupies a bottom portion of the image forming apparatus main body 12. A document reading unit 13 which is a movable unit is disposed over the image forming apparatus main body 12.

The sheet supply unit 14 has a sheet supply unit main body 16 and a sheet supply cassette 18 which houses plain sheets, for example. The sheet supply cassette 18 is attached to the sheet supply unit main body 16 in a slidable manner, and can be pulled out to the front side (i.e., leftward in FIG. 1). That is, the image forming apparatus 10 is configured in such a manner that a user can supply sheets from the front side of the image forming apparatus main body 12. A feed roll 20 for taking recording media from the sheet supply cassette 18 and a retardation roll 22 for separating the thus-taken recording media into individual ones are disposed close to (above) the rear end of the sheet supply cassette 18. A cassette sensor 19 for detecting presence/absence of sheets in the sheet supply cassette 18 is disposed close to the sheet supply cassette 18.

A transport path 24, which is a recording medium path extending from the feed roll 20 to an ejection mouth 26, is located in the rear of the image forming apparatus main body 12 (i.e., close to its right side wall in FIG. 1) and is formed so as to extend approximately vertically from the sheet supply unit 14 to a fuser 84. A secondary transfer roll 76 and a secondary transfer backup roll 68 (both described later) are disposed upstream of the fuser 84 in the transport path 24. Registration rolls 28 are disposed upstream of the secondary transfer roll 76 and the secondary transfer backup roll 68. Ejection rolls 30 are disposed in the vicinity of the ejection mouth 26 in the transport path 24.

Therefore, recording media that have been sent out from the sheet supply cassette 18 of the sheet supply unit 14 by the feed roll 20 are separated by the retardation roll 22. Only the topmost recording medium is guided to the transport path 24 and temporarily stopped by the registration rolls 28 for a timing adjustment. A toner image is transferred to the recording medium as it passes between the secondary transfer roll 76 and the secondary transfer backup roll 68 (described later), and the transferred toner image is fused by the fuser 84. Then, the recording medium is ejected through the ejection mouth 26 by the ejection rolls 30, to an ejection unit 32 which occupies a top portion of the image forming apparatus main body 12. The ejection unit 32 is inclined in such a manner that it is lowest at the position corresponding to the ejection mouth 26 and becomes higher at the front end (leftward in FIG. 1).

A rotary developing unit 34 is disposed in the image forming apparatus main body 12 on the opposite side of a photoreceptor drum 46 (described later) to an intermediate transfer belt 60 (described later). The rotary developing unit 34 has in a developing unit main body 36, developing devices 38*a*, 38*b*, 38*c*, and 38*d* for forming toner images of four colors (yellow, magenta, cyan, and black), respectively, and is rotated counterclockwise in FIG. 1 about a rotary developing unit center 40. The developing devices 38*a*, 38*b*, 38*c*, and 38*d* have respective development rolls 42a, 42b, 42c, and 42d, and are urged in the normal directions of the developing unit main body 36 by elastic members (not shown) such as coil springs. The developing devices 38a, 38b, 38c, and 38d are charged with respective toners (developers) of the four colors (yellow, magenta, cyan, and black), and are provided with respective toner sensors 44a, 44b, 44c, and 44d for detecting residual amounts of toners. Each of the developing devices 38a, 38b, 38c, and 38d is an integral subunit and can be detached from the image forming apparatus main body 12.

The photoreceptor drum (photoreceptor body) 46 as an image carrying body is disposed so as to be in contact with the rotary developing unit 34. When not in contact with the photoreceptor drum 46, part of the outer circumferential surface of each of the development rolls 42a, 42b, 42c, and 42d projects in the radial direction by 2 mm, for example, from the outer circumferential surface of the developing unit main body 36. Tracking rolls (not shown) which are slightly larger in diameter than each of the development rolls 42a, 42b, 42c, and 42d are. disposed on both sides of each development roll so as to rotate about the same axis as each development roll does. That is, the tracking rolls of each of the development rolls 42a, 42b, 42c, and 42d is brought into contact with flanges (not shown) provided at both ends of the photoreceptor drum 46 and a prescribed gap is formed between each development roll and the photoreceptor drum 46, whereby a latent image on the photoreceptor drum 46 is developed with the toner of each color.

A charging device 48, which is a charging roll, for example, and serves to charge the photoreceptor drum 46 uniformly, is disposed under the photoreceptor drum 46. A photoreceptor drum cleaner 50 is in contact with the photoreceptor drum 46 at a position upstream of the charging device 48 in the rotation direction of the photoreceptor drum 46. For example, the photoreceptor drum cleaner 50 is composed of a cleaning blade 52 for scraping off toner remaining on the photoreceptor drum 46 after a primary transfer and a toner collection bottle 54 for collecting the toner scraped off by the cleaning blade 52. The toner collection bottle 54 is provided with a cleaner sensor 55 for detecting whether the toner collection bottle 54 has space for collection of further toner.

An exposing unit 56 for writing, with light such as laser light, a latent image on the photoreceptor drum 46 that has been charged by the charging device 48 is disposed below the rotary developing unit 34. An intermediate transfer unit 58 which primarily transfers, at a primary transfer position, a toner image (visualized image) produced by the rotary developing unit 34 and then transfers the toner image to a secondary transfer position (described later) is disposed above the rotary developing unit 34.

The intermediate transfer unit 58 is composed of the intermediate transfer belt 60, a primary transfer roll 62, a wrap-in roll 64, a wrap-out roll 66, the secondary transfer backup roll 68, a scraper backup roll 70, and a brush backup roll 72. The intermediate transfer belt 60 has a primary transfer portion (photoreceptor drum wrapping region) that is wrapped about and is in contact with the photoreceptor drum 46 between, the wrap-in roll 64 which is located on the back surface side of the intermediate transfer belt 60 upstream of the primary transfer roll 62, and the wrap-out roll 66 which is located downstream of the primary transfer roll 62. As such, the intermediate transfer belt 60 is wound on the photoreceptor drum 46 only in its prescribed range and is rotated following the rotation of the photoreceptor drum 46. Toner images sequentially formed on the photoreceptor drum 46 are primarily transferred, in superimposition, to the intermediate transfer belt 60 in order of yellow, magenta, cyan, and black, for example, by the primary transfer roll 62. The intermediate transfer belt 60 transports the primarily transferred toner images to the secondary transfer roll 76 (described later).

The secondary transfer backup roll 68 causes the intermediate transfer belt 60 to have a projected portion on the rear side. The projected portion, which is a secondary transfer portion, exists in the transport path 24.

The scraper backup roll 70 assists a scraper 80 (described later) in scraping off toner remaining on the intermediate transfer belt 60 after a secondary transfer. The brush backup roll 72 assists a brush roll 82 (described later) in scraping off toner remaining on the intermediate transfer belt 60 after the secondary transfer.

The secondary transfer roll 76 is opposed to the secondary transfer backup roll 68 of the intermediate transfer unit 58 across the transport path 24. That is, the position between the secondary transfer roll 76 and the secondary transfer backup roll 68 is a secondary transfer position of the secondary transfer portion. Assisted by the secondary transfer backup roll 68, the secondary transfer roll 76 secondarily transfers toner images that have been primarily transferred to the intermediate transfer belt 60 to a recording medium at the secondary transfer position. The secondary transfer roll 76 is separated from the intermediate transfer belt 60 while the intermediate transfer belt 60 makes three rotations, that is, transports toner images of three colors (yellow, magenta, and cyan). The secondary transfer roll 76 is brought into contact with the intermediate transfer belt 60 when a black toner image has been transferred primarily to it.

An intermediate transfer belt cleaner 78 is disposed adjacent to a top end portion of the intermediate transfer belt 60. For example, the intermediate transfer belt cleaner 78 is composed of the scraper 80 for cleaning the intermediate transfer belt 60 after a secondary transfer by scraping off toners remaining on the intermediate transfer belt 60, the brush roll 82 for scraping off toner remaining on the intermediate transfer belt 60 even after the cleaning by the scraper 80, a toner collection bottle (not shown) for collecting the toner scraped off by the scraper 80 and the brush roll 82. The scraper 80 is a thin stainless steel plate, for example, and is given a voltage that is opposite in polarity to a voltage applied to the toner. The scraper 80 and the brush roll 82 are separated from the intermediate transfer belt 60 while the intermediate transfer belt 60 transports toner images for color superimposition, and are together brought into contact with the intermediate transfer belt 60 with a prescribed timing.

The fuser 84 is disposed over the secondary transfer position and has a heating roll 88 and a pressure roll 90. The heating roll 88 and the pressure roll 90 fuse toner images that have been secondarily transferred to the recording medium by the secondary transfer roll 76 and the secondary transfer backup roll 68 onto a recording medium, utilizing heat and pressure. The heating roll 88 and pressure roll 90 then transport the recording medium toward the ejection rolls 30. A fusing sensor 86 for detecting a sheet transport failure occurring in the fuser 84 is disposed in the vicinity of the fuser 84.

All or part of the intermediate transfer unit 58, the photoreceptor drum 46, the charging device 48, the photoreceptor drum cleaner 50, and the intermediate transfer belt cleaner 78 may be integrated into an image forming unit which can be detached from the image forming apparatus main body 12.

The image forming apparatus main body 12 is provided with an opening/closing cover 94 which is an opening/closing member. The opening/closing cover 94 can be opened and closed from the front side of the image forming apparatus main body 12; that is, the opening/closing cover 94 is opened and closed between a closed position indicated by a two-dot chain line in FIG. 1 and an open position indicated by a solid line by rotating it about a rotation supporting point 96.

The document reading unit 13 is a scanner having a document placement stage 102 on which a document sheet to be read is to be placed, an automatic document feeder 104 for feeding a document sheet to the document placement stage 102, and an electric parts accommodation unit 106 in which electric parts such as an ESS board are accommodated. The document reading unit 13 is attached to support portions 110 that project from top-rear (top-right in FIG. 1) portions of the image forming apparatus main body 12. The document reading unit 13 can move between a first position (see FIG. 2A) where it is located during image formation and a second position (see FIG. 2B) that is retreated from the first position by rotating about a rotation supporting point 112. Whether the document reading unit 13 is located at the first position or the second position is detected by a position sensor 114 which is provided on the image forming apparatus main body 12 in the vicinity of the rotation supporting point 112.

When located at the first position, the document reading unit 13 interferes with the opening/closing cover 94 being opened or closed. When it is attempted to open or close the opening/closing cover 94, its tip portion unavoidably hits the document reading unit 13. On the other hand, when located at the second position, the document reading unit 13 does not interfere with the opening/closing cover 94 being opened or closed and can be opened or closed freely.

A first display panel 116 which is an LCD panel and serves as a first display is provided on the front surface (left portion in FIG. 1) of the image forming apparatus main body 12 which is generally directed upward in the state that the document reading unit 13 is in a position for image formation. The first display panel 116 makes a display of an instruction to supply recording media to the sheet supply cassette 18 (e.g., "Supply sheets") and a display for prompting an operator to start maintenance work such as a display of an instruction to replace the developing device 38a (e.g., "Replace the yellow developing device"). Furthermore, the first display panel 116 makes a display for explaining a specific manipulation or operation necessary for maintenance such as "Pull out the sheet supply cassette to your side" or "First, lift up the image reading unit." The display for prompting an operator to start maintenance work and the display for explaining a specific manipulation or operation necessary for maintenance are made simultaneously. For example, the first display panel 116 can make the display "Replace the yellow developing device. First, lift up the image reading unit."

As described above, the first display panel 116 displays necessary maintenance work and is disposed at such a position as to be seen easily by an operator who is manipulating the image forming apparatus 10. Therefore, when the document reading unit 13 is located at the first position, the first display panel 116 is used by an operator not only to check whether there exists necessary maintenance work while manipulating the image forming apparatus 10, but also to recognize a specific manipulation necessary for maintenance work while doing the maintenance work.

The information relating to the specific manipulation or operation necessary for maintenance work which is displayed on the first display panel 116 is classified as first manipulation information and is limited to information relating to a manipulation that can be performed by an operator when the document reading unit 13 is located at the first position. Information that is classified as second manipulation information and relates to work that is enabled only after the document reading unit 13 is moved to the second position is not displayed on the first display panel 116. For example, replacement of the yellow developing device 38a requires a manipulation of opening the opening/closing cover 94. However, information relating to the manipulation of opening the opening/closing cover 94 is not displayed on the first display panel 116 because this manipulation is enabled only after the document reading unit 13 is moved to the second position so that it does not interfere with the opening/closing cover 94 any more.

The document reading unit 13 is provided with an operating panel 118 in the vicinity of the first display panel 116. The operating panel 118 is used for such manipulations as specifying the number of sheets on which image formation should be performed and inputting desired image quality such as a density of images to be formed.

In the image forming apparatus 10 having the above configuration, when a document sheet has been read by the document reading unit 13 and an image formation signal has been sent to the image forming apparatus main body 12, the photoreceptor drum 46 is charged uniformly by the charging device 48, and a light beam emitted from the exposing unit 56 according to the image formation signal shines on the thus-charged photoreceptor drum 46. The surface of the photoreceptor drum 46 is exposed to the light beam coming from the exposing unit 56, and a latent image is formed thereon. Latent images formed on the photoreceptor drum 46 by the exposing unit 56 are developed by the rotary developing unit 34 into yellow, magenta, cyan, and black toner images, which are primarily transferred to the intermediate transfer belt 60 in superimposition. Waste toner remaining on the photoreceptor drum 46 after each primary transfer is scraped off and collected by the photoreceptor drum cleaner 50.

On the other hand, according to a recording medium supply signal etc., a recording medium is sent out from the sheet supply cassette 18 by the feed roll 20, separated by the retardation roll 22, and guided to the transport path 24. After temporarily stopped by the registration rolls 28 for a timing adjustment, the recording medium is guided to the position between the secondary transfer roll 76 and the secondary transfer backup roll 68. When the recording medium is guided to the position between the secondary transfer roll 76 and the secondary transfer backup roll 68, the toner images that have been primarily transferred to the intermediate transfer belt 60 are secondarily transferred to the recording medium by the secondary transfer roll 76 and the secondary transfer backup roll 68. Waste toners remaining on the intermediate transfer belt 60 after the secondary transfer are scraped off and collected by the intermediate transfer belt cleaner 78.

The recording medium to which the toner images have been transferred is guided to the fuser 84. The fuser 84 using the heating roll 88 and the pressure roll 90 fuses the toner images onto the recording medium utilizing heat and pressure. The toner-image-fused recording medium is then ejected to the ejection unit 32 via the ejection rolls 30.

Figure 2B:
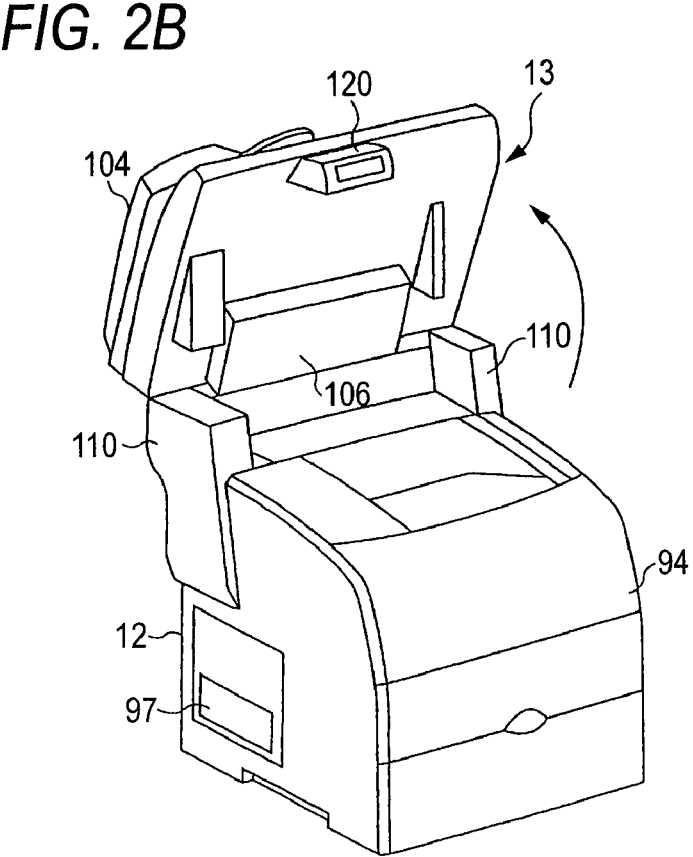

As shown in FIG. 2B, a second display panel 120 which is an LCD panel and serves as a second display is disposed on the surface (hereinafter referred to as "back surface") of the document reading unit 13 which is directed to the operator side when the document reading unit 13 is located in a second position. That is, the second display panel 120 is disposed at such a position as to be seen by an operator when the document reading unit 13 has been moved to the second position. Like the first display panel 116, the second display panel 120 makes a display of an instruction to supply recording media to the sheet supply cassette 18 (e.g., "Supply sheets") and a display for prompting an operator to start maintenance work in the form of a display indicating a component to be subjected to maintenance work such as a display of an instruction to replace the developing device 38a (e.g., "Replace the yellow developing device").

Furthermore, the second display panel 120 makes a display for explaining a specific manipulation necessary for maintenance. The information relating to the specific manipulation which is displayed on the second display panel 120 is information that is classified as second manipulation information and relates to a manipulation to be performed subsequently to the manipulation that was displayed on the first display panel 116. For example, assume that the first display panel 116 made a display "Replace the yellow developing device. First, lift up the image reading unit." In this case, the second display panel 120 makes a display "Then, open the opening/closing cover, remove the yellow developing device, and attach a new yellow developing device." as a display of information relating to a manipulation to be performed subsequently to the manipulation of lifting up the document reading unit 13.

As described above, the second display panel 120 displays information relating to a maintenance operation that needs to be performed after the manipulation displayed on the first display panel 116 has been performed, or information relating to replacement of a subunit. The second display panel 120 is also used for checking whether there exists necessary maintenance work when an operator is manipulating the image forming apparatus 10 in the state that the document reading unit 13 is located at the second position.

Figure 3:
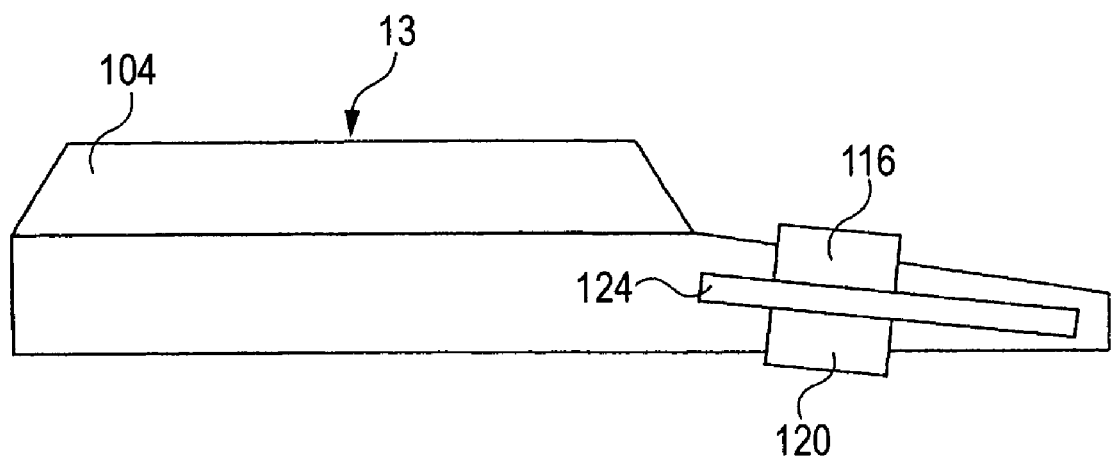
FIG. 3 shows how a first display and a second display of the image forming apparatus according to the first exemplary embodiment of the invention are mounted.
Figure 4:
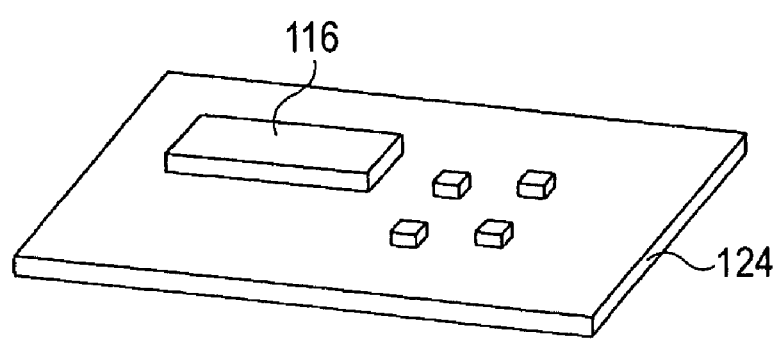
FIG. 4 is a perspective view of a drive board for driving the first display and the second display of the image forming apparatus according to the first exemplary embodiment of the invention.

FIGS. 3 and 4 show how the first display panel 116 and the second display panel 120 are attached to the document reading unit 13. The first display panel 116 is mounted on a drive board 124 for driving it in such a manner that its display screen is directed upward when viewed in FIGS. 3 and 4. The drive board 124 is also mounted with the second display panel 120 in such a manner that its display screen is directed downward when viewed in FIGS. 3 and 4. The first display panel 116 and the second display panel 120 are attached to the document reading unit 13 so that they can be seen from the front surface (i.e., the surface that is located outside when the document reading unit 13 is in use) and the back surface of the document reading unit 13, respectively.

As described above, the second display panel 120 is mounted on the same drive board 124 as the first display panel 116 is mounted. This makes it unnecessary to use two drive boards to mount the first display panel 116 and the second display panel 120 on separate drive boards.

Figure 5:
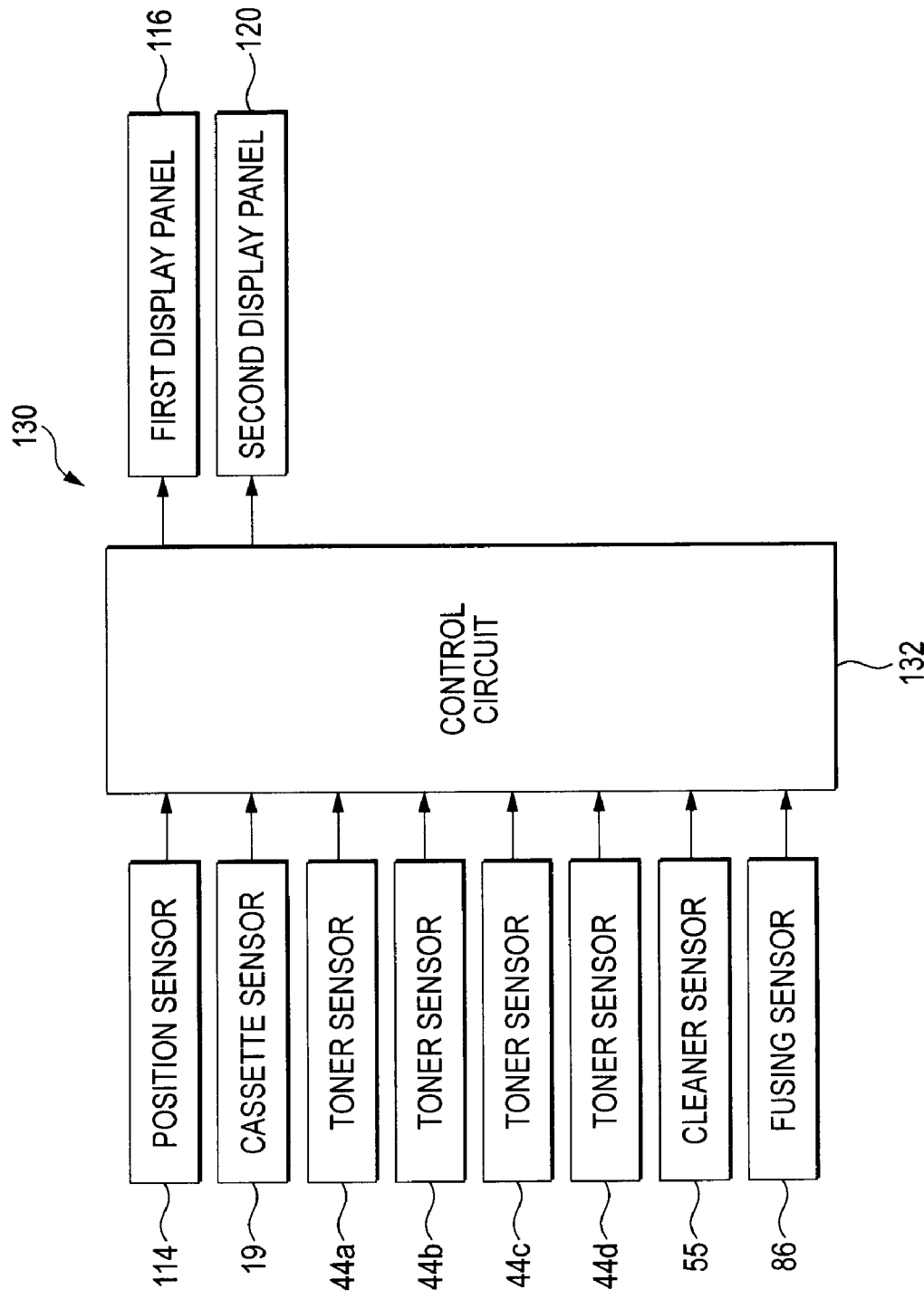
FIG. 5 is a block diagram of a control section of the image forming apparatus according to the first exemplary embodiment of the invention.

FIG. 5 shows a controller 130 of the image forming apparatus 10 according to the first exemplary embodiment. The controller 130 has a control circuit 132 to which detection signals of the position sensor 114, the cassette sensor 19, the toner sensors 44a, 44b, 44c, and 44d, the cleaner sensor 55, and the fusing sensor 86 are input. The first display panel 116 and the second display panel 120 are controlled on the basis of an output of the control circuit 132.

If the control circuit 132 determines that no sheets are in the sheet supply cassette 18 based an output of the cassette sensor 19, the control circuit 132 causes the first display panel 116 or the second display panel 120 to make a display prompting resupplying of sheets such as "Supply sheets" or "Pull out the sheet supply cassette to your side." In so doing, the control circuit 132 judges whether the document reading unit 13 is located at the first position or the second position on the basis of an output of the position sensor 114. The control circuit 132 causes the first display panel 116 to make a display for prompting resupplying of sheets if the control circuit 132 determines that the document reading unit 13 is located at the first position. On the other hand, the control circuit 132 causes the second display panel 120 to make a display for prompting resupplying of sheets if the control circuit 132 determines that the document reading unit 13 is located at the second position.

If the control circuit 132 determines, on the basis of an output of the position sensor 114, that the document reading unit 13 has been moved to the second position while the first display panel 116 is making the display for prompting resupplying of sheets which was started when the document reading unit 13 was located at the first position, the control circuit 132 causes the first display panel 116 to stop the display for prompting resupplying of sheets. At the same time, the control circuit 132 causes the second display panel 120 to make a display for prompting resupplying of sheets. In this manner, the second display panel 120 starts a display as soon as the first display panel 116 stops displaying.

If the control circuit 132 determines, on the basis of an output of the position sensor 114, that the document reading unit 13 has been moved to the first position while the second display panel 120 is making the display for prompting resupplying of sheets which was started when the document reading unit 13 was located at the second position, the control circuit 132 causes the second display panel 120 to stop the display for prompting resupplying of sheets. At the same time, the control circuit 132 causes the first display panel 116 to make a display for prompting resupplying of sheets. In this manner, the second display panel 120 stops the display as soon as the first display panel 116 begins displaying.

If the control circuit 132 determines, on the basis of an output of the toner sensor 44a, 44b, 44c, or 44d, that the residual amount of toner in the developing device 38a, 38b, 38c, or 38d is smaller than a predetermined amount, the control circuit 132 causes, in the same manner as the display for prompting resupplying of sheets, the first display panel 116 or the second display panel 120 to make a display for prompting replacement of the yellow developing device 38a, the magenta display device 38b, the cyan developing device 38c, or the black display device 38d such as "Replace the yellow developing device," "Replace the magenta developing device," "Replace the cyan developing device," or "Replace the black developing device."

If the control circuit 132 determines, on the basis of an output of the cleaner sensor 55, that no sufficient space for toner collection remains in the toner collection bottle 54, the control circuit 132 causes, in the same manner as the display for prompting resupplying of sheets, the first display panel 116 or the second display panel 120 to make a display for prompting replacement of the toner collection bottle 54 such as "Replace the toner collection bottle."

If the control circuit 132 determines, on the basis of an output of the fusing sensor 86, that a sheet transport failure has occurred in the fuser 84, the control circuit 132 causes, in the same manner as the display for prompting resupplying of sheets, the first display panel 116 or the second display panel 120 to make a display for prompting removal of the sheet that has caused the transport failure such as "Remove the sheet from the fuser."

In addition to causing the first display panel 116 and the second display panel 120 to make a display for prompting maintenance work or replacement of a subunit, the control circuit 132 causes the first display panel 116 and the second display panel 120 to display manipulation information relating to, for example, a specific manipulation method according to which the maintenance work or the replacement of a subunit should be performed. First, the control circuit 132 determines, based on an output of the position sensor 114, whether the document reading unit 13 is located at the first position or the second position. The control circuit 132 causes the first display panel 116 to display manipulation information if the control circuit 132 determines that the document reading unit 13 is located at the first position. On the other hand, the control circuit 132 causes the second display panel 120 to display manipulation information if the control circuit 132 determines that the document reading unit 13 is located at the second position. The display made at this stage is a display of first manipulation information relating to replacement of a subunit. For example, if the subunit to be replaced is the yellow developing device 38a, a display "Replace the yellow developing device. Lift up the document reading unit first if it is not done so." is made.

If the first manipulation information is displayed on the first display panel 116, the control circuit 132 waits for input from the position sensor 114 of a signal indicating detection of a movement of the document reading unit 13 to the second position. Upon reception of that signal, the control circuit 132 switches the actual display location from the first display panel 116 to the second display panel 120.

After causing the display of the first manipulation information, the control circuit 132 causes the second display panel 120 to display second manipulation information. For example, when information relating to a manipulation for replacing the yellow developing device 38a should be displayed, the control circuit 132 causes the second display panel 120 to make a display "Then, open the opening/closing cover, remove the yellow developing device, and attach a new yellow developing device."

Figure 6:
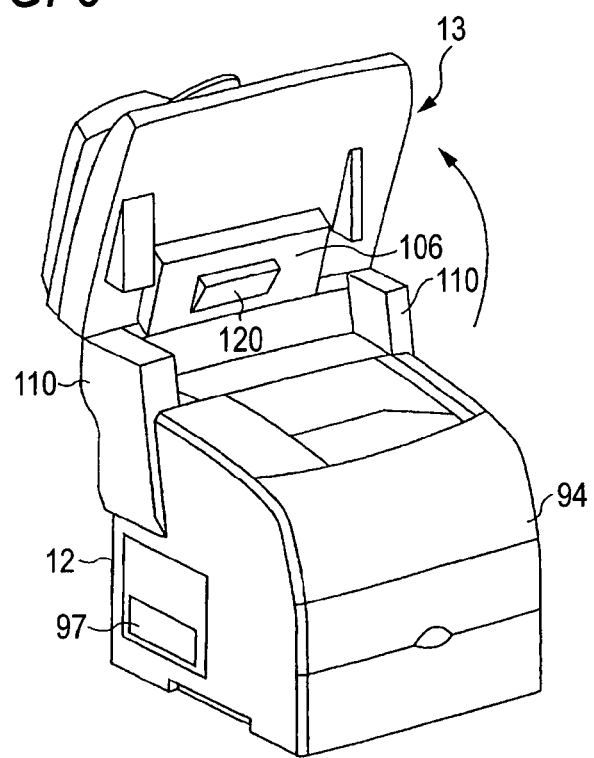
FIG. 6 is a perspective view of an image forming apparatus according to a second exemplary embodiment of the invention.

FIG. 6 shows an image forming apparatus 10 according to a second exemplary embodiment of the invention. In the above-described first exemplary embodiment the second display panel 120 is provided on the back side of the document reading unit 13 and mounted on the same drive board 124 as the first display panel 116 is mounted. In the second exemplary embodiment, the second display panel 120 is provided on the back side of the document reading unit 13, that is, on the outside surface of the electric parts accommodation unit 106. Since the second display panel 120 is provided on the outside surface of the electric parts accommodation unit 106, the second display panel 120 can be disposed close to the electric parts accommodated in the electric parts accommodation unit 106 which in turn facilitates supplying power to the second display panel 120. Components of the second exemplary embodiment having the same components in the first exemplary embodiment are given the same reference symbols in FIG. 6 as in FIG. 2, and will not be described.

Figure 7:
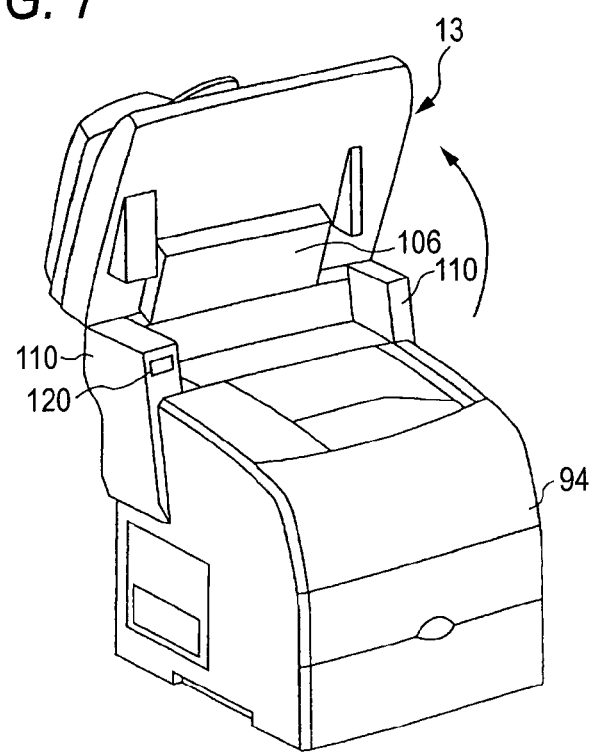
FIG. 7 is a perspective view of an image forming apparatus according to a third exemplary embodiment of the invention.

FIG. 7 shows an image forming apparatus 10 according to a third exemplary embodiment of the invention. Whereas the second display panel 120 is provided on the back side of the document reading unit 13 in the above-described first and second exemplary embodiments, the second display panel 120 is provided on the image forming apparatus main body 12 in the third exemplary embodiment. The second display panel 120 is provided on the image forming apparatus main body 12 at such a position as to be seen by an operator standing at a manipulation position when the document reading unit 13 is located at the second position. Components of the third exemplary embodiment having the same components in the first exemplary embodiment are given the same reference symbols in FIG. 7 as in FIG. 2, and will not be described.

Figure 8:
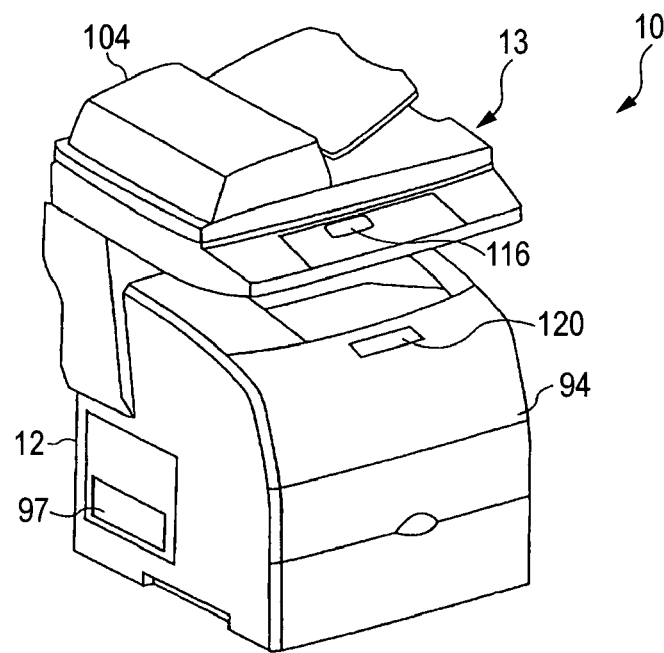
FIG. 8 is a perspective view of an image forming apparatus according to a fourth exemplary embodiment of the invention.

FIG. 8 shows an image forming apparatus 10 according to a fourth exemplary embodiment of the invention. Whereas in the above-described third exemplary embodiment the second display panel 120 is provided on the image forming apparatus main body 12, in the fourth exemplary embodiment the second display panel 120 is provided on the outside surface of the opening/closing cover 94. The second display panel 120 is provided on the outside surface of the opening/closing cover 94 at such a position as to be seen by an operator standing at a manipulation position when the document reading unit 13 is located at the second position. Components of the fourth exemplary embodiment having the same components in the first exemplary embodiment are given the same reference symbols in FIG. 8 as in FIG. 2, and will not be described.

Figure 9:
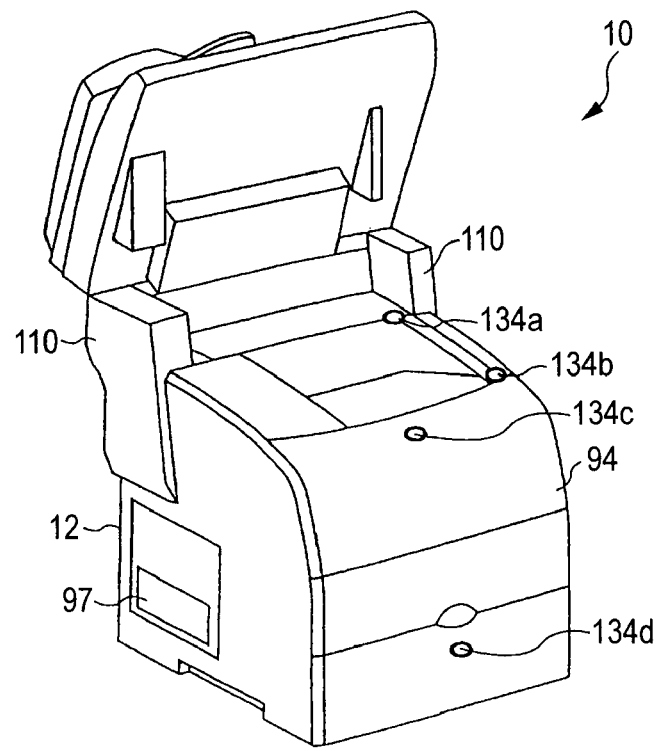
FIG. 9 is a perspective view of an image forming apparatus according to a fifth exemplary embodiment of the invention.

FIG. 9 shows an image forming apparatus 10 according to a fifth exemplary embodiment of the invention. Whereas in the above-described first to fourth exemplary embodiments one display panel such as an LCD panel is used as the second display when the document reading unit 13 has been moved to the second position, in the fifth exemplary embodiment plural light-emitting elements (e.g., light-emitting diodes) 134a, 134b, 134c, and 134d are used as the second display.

The light-emitting element 134a is disposed on the outside surface of the image forming apparatus main body 12 in the vicinity of the fuser 84. If the fusing sensor 86 detects a sheet jam in the fuser 84, the control circuit 132 controls the light-emitting element 134a so that it starts emitting light. The light-emitting element 134b is disposed on the outside surface of the image forming apparatus main body 12 in the vicinity of the toner collection bottle 54. If the cleaner sensor 55 detects that no space for toner collection remains in the toner collection bottle 54, the control circuit 132 controls the light-emitting element 134b so that it starts emitting light. The light-emitting element 134c is disposed on the outside surface of the image forming apparatus main body 12 in the vicinity of the rotary developing unit 34. If the toner sensor 44a, 44b, 44c, or 44d detects that the residual amount of the developer of the developing device 38a, 38b, 38c, or 38d is smaller than a predetermined amount, the control circuit 132 controls the light-emitting element 134c so that it starts emitting light. The light-emitting element 134d is disposed on the outside surface of the image forming apparatus main body 12 in the vicinity of the sheet supply cassette 18. If the cassette sensor 19 detects that no sheets are placed in the sheet supply cassette 18, the control circuit 132 controls the light-emitting element 134d so that it starts emitting light. Components of the fifth exemplary embodiment having the same components in the first exemplary embodiment are given the same reference symbols in FIG. 9 as in FIG. 2, and will not be described.

Figure 10:
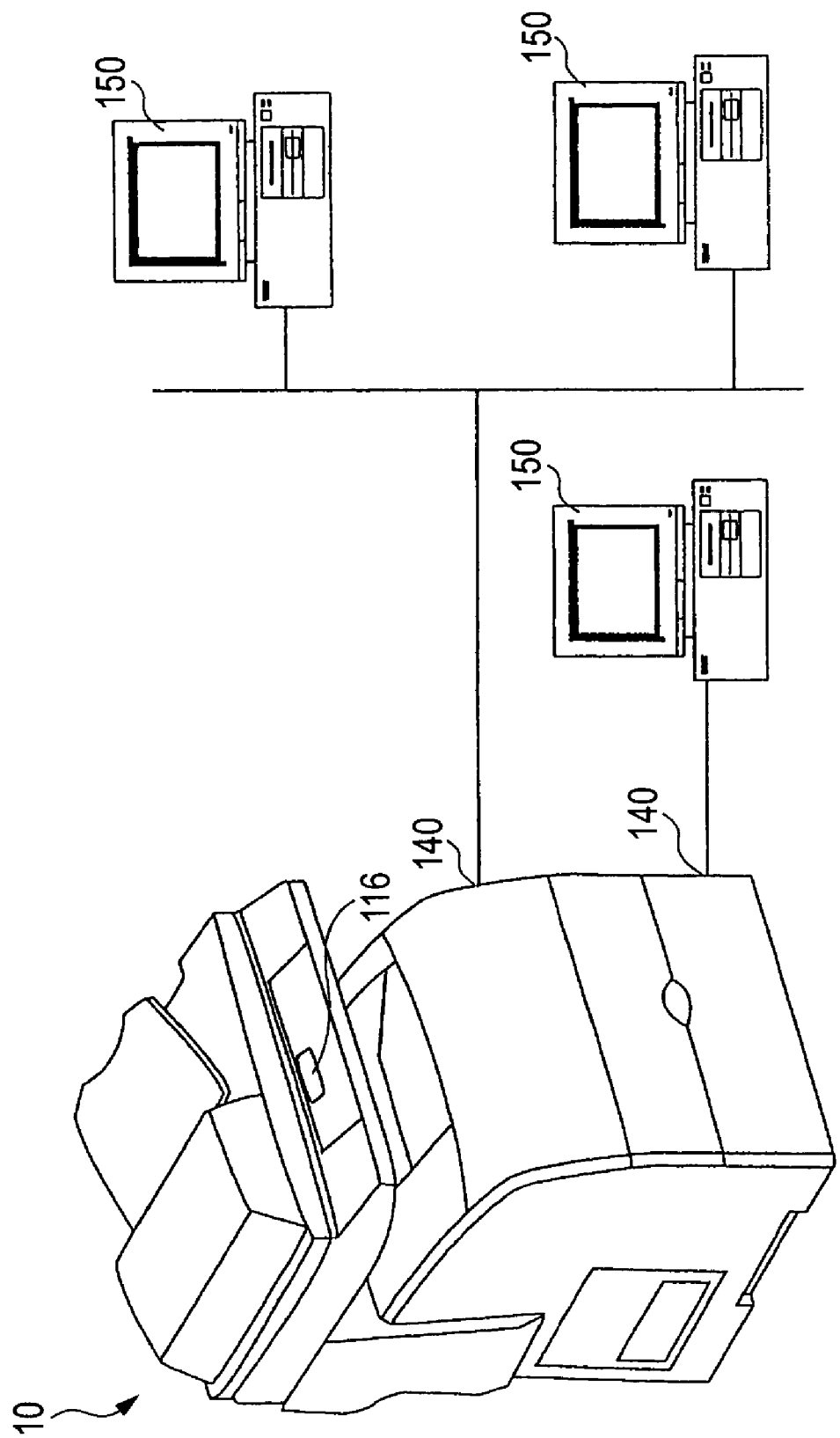
FIG. 10 is a perspective view of an image forming apparatus according to a sixth exemplary embodiment of the invention.

FIG. 10 shows an image forming apparatus 10 according to a sixth exemplary embodiment of the invention. In the above-described first to fifth exemplary embodiments, the second display panel 120 or the like is provided as the second display which is used when the document reading unit 13 has been moved to the second position. In contrast, in the sixth exemplary embodiment, the image forming apparatus 10 does not have a display to be used when the document reading unit 13 has been moved to the second position. Instead, when the document reading unit 13 has been moved to the second position, display 150 such as personal computers which are located outside the image forming apparatus 10 make displays.

In the image forming apparatus 10 according to the sixth exemplary embodiment, a connection terminal 140 as a transmitting device is provided on the outside surface of the image forming apparatus main body 12. Information to be displayed on the display 150 is transmitted thereto via the connection terminal 140, and is displayed on the display 150 when the document reading unit 13 has been moved to the second position.

In each of the above exemplary embodiments, the second display panel 120 or the like which can be recognized visually is used as the second display which is used when an operator has moved the document reading unit 13 to the second position. Alternatively or in addition to it, a voice indication such as a speaker 97 (see FIG. 2) may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a movable unit that can move between a first position that is for when image formation is being performed and a second position that is retreated from the first position;
    a first display that is used when the movable unit is in the first position; and
    a second display that is used when the movable unit is in the second position;
    wherein the movable unit includes a first surface and a second surface, the second surface being opposed to the first surface, and
    wherein the first display is provided on the first surface and the second display is provided on the second surface.

2. The image forming apparatus according to claim 1, wherein the second display begins a display after a display by the first display ends.

3. The image forming apparatus according to claim 1, wherein the second display ends a display after a display by the first display begins.

4. The image forming apparatus according to claim 1, wherein the second display begins a display after the movable unit has moved to the second position.

5. The image forming apparatus according to claim 1, wherein the second display ends a display after the movable unit has moved to the first position.

6. The image forming apparatus according to claim 1, wherein the first display ends a display after the movable unit has moved to the second position.

7. The image forming apparatus according to claim 1, wherein the first display begins a display after the movable unit has moved to the first position.

8. The image forming apparatus according to claim 1, wherein the second display is mounted on a drive board on which the first display is also mounted.

9. The image forming apparatus according to claim 1, wherein the second display is provided at a position that can be seen by an operator when the movable unit has moved to the second position.

10. The image forming apparatus according to claim 1, wherein the second display is provided on the movable unit.

11. The image forming apparatus according to claim 1, wherein the second display is provided on a main body of the image forming apparatus.

12. The image forming apparatus according to claim 1, further comprising a plurality of electric parts, wherein the second display is provided in a vicinity of the plurality of electric parts.

13. The image forming apparatus according to claim 1, wherein the second display displays a component that requires a maintenance work.

14. The image forming apparatus according to claim 1, wherein the second display performs an indication by a voice.

15. The image forming apparatus according to claim 11, further comprising an opening/closing member that is provided on the main body of the image forming apparatus that can be opened and closed, wherein the movable unit does not interfere with the opening/closing member when the movable unit is in the second position.

16. The image forming apparatus according to claim 1, wherein the movable unit is a document reader.

17. An image forming apparatus comprising:
    a movable unit that can move between a first position that is for when image formation is being performed and a second position that is retreated from the first position;
    a first display that is used when the movable unit is in the first position; and
    a transmitter for transmitting an information to be displayed on a second display, wherein the second display is used when the movable unit is in the second position;
    wherein the movable unit includes a first surface and a second surface, the second surface being opposed to the first surface, and
    wherein the first display is provided on the first surface and the second display is provided on the second surface.

18. A maintenance method of an image forming apparatus that comprises a movable unit, a first display, and a second display, comprising:
    moving the movable unit in accordance with a first manipulation information displayed on the first display, from a first position that is for when image formation is being performed to a second position that is retreated from the first position; and
    performing a maintenance work in accordance with a second manipulation information displayed on the second display that is used when the movable unit is in the second position;
    wherein the movable unit includes a first surface and a second surface, the second surface being opposed to the first surface, and
    wherein the first display is provided on the first surface and the second display is provided on the second surface.

19. The maintenance method of an image forming apparatus according to claim 18, wherein the second manipulation information is information relating to a manipulation to be performed subsequent to a manipulation corresponding to the first manipulation information.

* * * * *